UNITED STATES PATENT OFFICE.

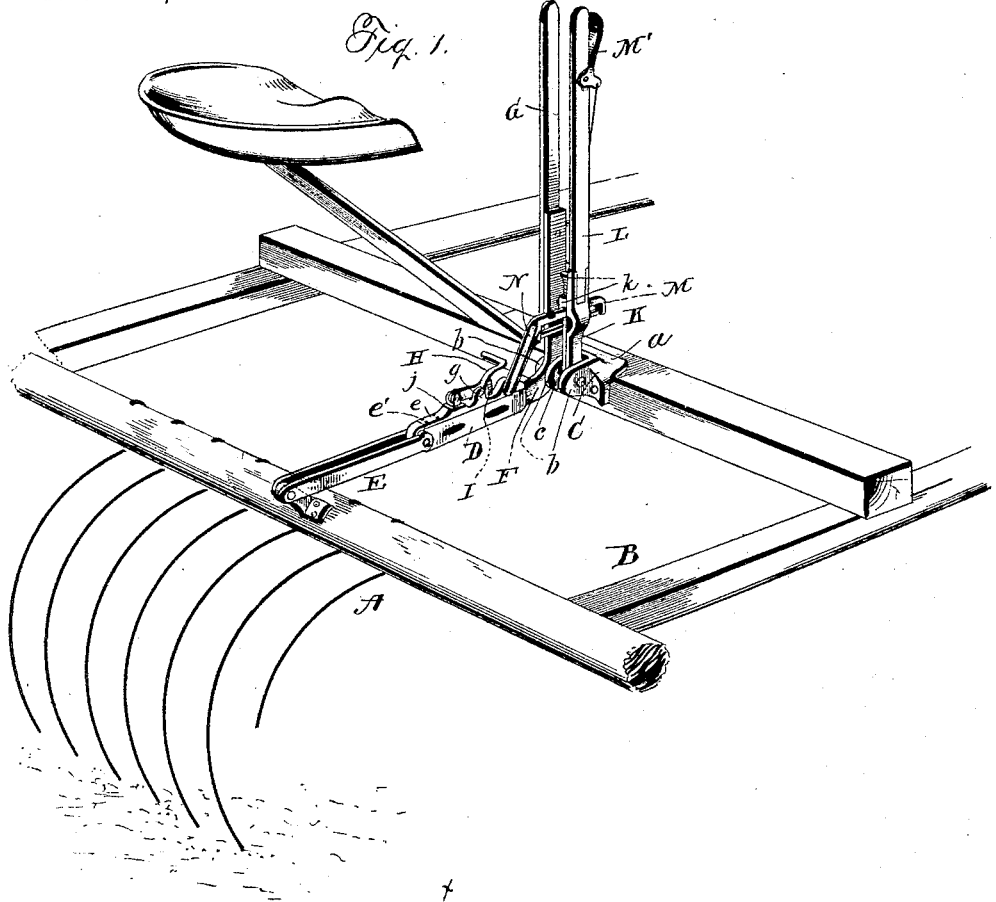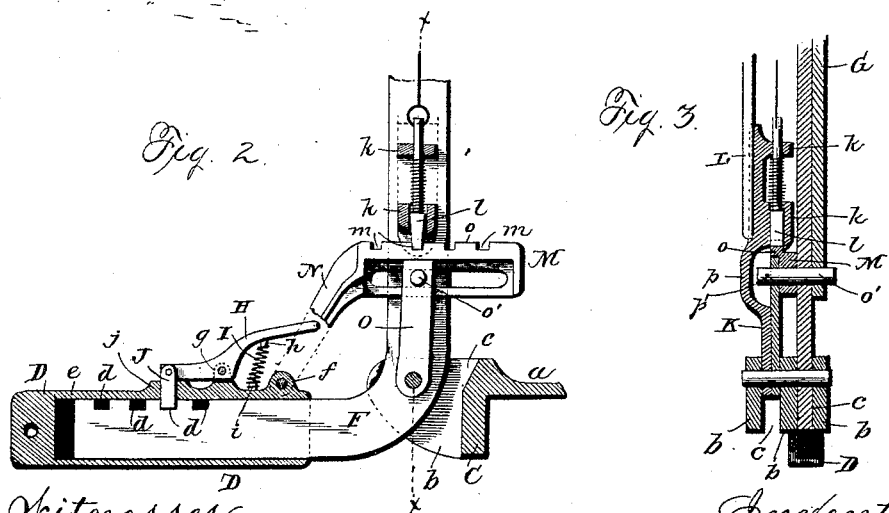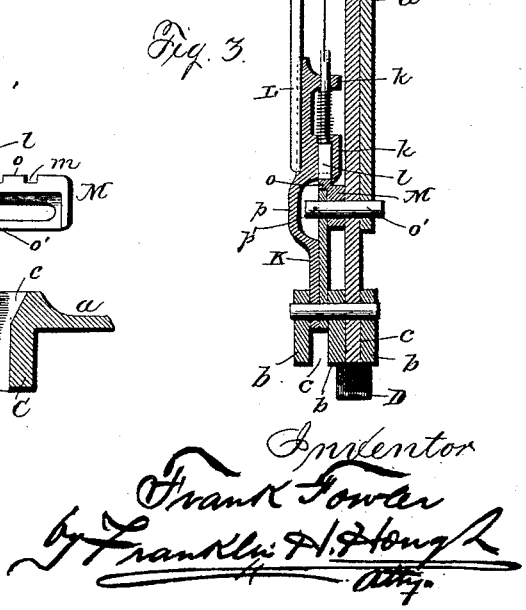

FRANK FOWLER, OF MAPLETON, MICHIGAN.

HORSE HAY-RAKE.

SPECIFICATION forming part of Letters Patent No. 453,694, dated June 9, 1891.

Application filed November 22, 1890. Serial No. 372,306. (No model.)

*To all whom it may concern:*

Be it known that I, FRANK FOWLER, a citizen of the United States, residing at Mapleton, in the county of Grand Traverse and State of Michigan, have invented certain new and useful Improvements in Horse Hay-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in devices for attachment to hay-rakes, whereby the operator can readily regulate the rake without leaving his seat or stopping the team. I employ a casting which is secured to the cross-bar on the tongue. I have provisions for lengthening and shortening the connection between the head of the rake and the dump-lever, so that by shortening the connection the rake will run lighter and by lengthening it the rake will run close to the ground. I provide a foot-lever which controls the connection between the parts, the said lever being normally held to its work by a spring, which is compressed as the lever is pressed downward.

Other objects and advantages of the invention will hereinafter appear, and the novel features thereof will be specifically defined by the appended claims.

The novelty in the present instance resides in the peculiar combinations and the construction, arrangement, and adaptation of parts, as will be more fully hereinafter set forth, and then specified in the claims.

The invention is clearly illustrated in the accompanying drawings, which, with the letters of reference marked thereon, form a part of this specification, and in which—

Figure 1 is a perspective view of a portion of a hay-rake, showing the application of my improvement. Fig. 2 is a sectional view of my improved connection between the parts. Fig. 3 is a section through the same on the line $x$ $x$ of Fig. 2.

Like letters of reference indicate like parts throughout the several views.

Referring now to the details of the drawings by letter, A designates a rake of any known construction, and B the frame-work of the same.

C is a casting provided with an offset $a$, and designed to be secured by bolts or otherwise to the cross-bar of the tongue. It is formed with parallel ears $b$ to form two recesses $c$, in which the parts hereinafter described are pivoted.

D is a casting formed hollow for a purpose hereinafter made apparent, and from the rear end of this casting straps E extend and connect with the head of the rake in any suitable manner—such, for instance, as illustrated by dotted lines in Fig. 1.

F is an elbow pivoted at the bend between two of the ears of the casting C, with one end designed to fit within the casting D and designed to move therein. It is provided upon its upper face with notches $d$, for a purpose which will soon appear. G is a lever rigidly connected with the said elbow, and by means of this lever the rake is dumped when desired.

Upon the upper edge or face of the casting D is a cap-piece $e$, secured thereto in any suitable manner, as by bolts $e'$, (see Fig. 1,) and provided with an enlargement $f$ at one end, which enlargement is formed with a transverse opening for the reception of the pin on the slotted arm, so on to be described. This cap-piece is also formed with ears $g$, between which is pivoted the foot-lever H, one end of which is arranged within convenient reach of the foot of the driver and provided upon its under surface with a lug or projection $h$, with which is engaged one end of a coiled spring I, the other end of which is engaged over a similar lug or projection $i$ on the cap-piece. The other end of the foot-lever carries a vertically-operating pawl J, which is pivotally connected therewith and works through an opening in the enlargement $j$ of the cap-piece and engages the notches of the horizontal arm of the elbow to hold the parts in their adjusted position. Pivoted between the other ears and in the other recess of the casting C is a vertical arm K, having on its outer face a vertical groove or recess, into which the lower end of the lever L fits and is secured. The inner face of this vertical arm is formed with ears or lugs $k$, through which works the spring-actuated pawl l, connected with the thumb-piece M, pivoted to the upper end of the lever, the connection between the pawl and thumb-piece being by wire, cord, or any other suitable material. This pawl is designed to engage the notches m upon the upper face of the horizontal portion of the slotted arm M, which has an inclined extension N, which is pivotally connected to the casting D in any suitable manner—as, for instance, by means of a transverse pin n, which passes through the hole in the enlargement f of the cap-piece, as shown. The horizontal portion of this arm is slotted to receive the pin on which the lever G is pivoted. This horizontal portion is flanged at its upper edge, as shown at o, and the bottom ear or lug k is flanged oppositely, so as to form a guide for the horizontal arm in its movements.

O is a vertical arm pivotally secured between the ears of the casting D and designed to receive the inner end of the pivot O', on which the lever G is pivoted, as shown. The vertical arm K is formed with an offset p at this place to receive the inner end of said pivot, the end of which necessarily projects so as to receive a pin or key p' to prevent its displacement.

The operation will be readily understood. The rake is dumped, when desired, by the manipulation of the lever G. When it is desired to lengthen or shorten the connection between the rake-head and the dumping-lever for the purpose of making the rake hug the ground closer or to run lighter over it, all that it is necessary to do is to put the foot upon the foot-lever and thus disengage its pawl from the horizontal arm of the casting D, and then move the lever L in the desired direction, when the casting D moves on the elbow and shortens or lengthens the distance between the rake-head and the dumping-lever. The slotted arm moves also, and the parts are held in their adjusted position by the engagement of the pawl l with the notches of the horizontal portion of the slotted arm. The arm M is adjustably connected to the lever L, so as to enable the two levers G and L to be kept parallel to each other, no matter what the adjustment between the parts F and D may be.

The parts are readily applied to any horse hay-rake, are simple and durable, and in practice have proved most efficient for the purpose for which they are designed.

What I claim as new is—

1. The combination, with the rake-head and the rake, of the bracket C, attached to the main frame, the part D, the links connecting the part D and the rake-head, and the dump-lever pivoted to the bracket C and adjustably connected with the part D, substantially as described.

2. The combination, with the rake and rake-head, of the part C, the part D, linked to the rake-head, the elbow-lever pivoted to the part C and adjustably connected with the part D, substantially as described.

3. The combination, with the rake and rake-head, of the part C, attached to the main frame, the part D and link E, connecting the part D to the rake-head, the notched elbow-shaped dumping-lever pivoted to the part C, the levers G and L, the slotted arm pivoted to the part D and adjustably connected to the lever L, and the foot-lever pivoted in the part D and carrying a pin engaging the notched elbow-shaped dumping-lever, substantially as described.

4. The combination, with the rake and rake-head, of the part C, attached to the main frame, the part D and the link E, connecting the part D to the rake-head, the elbow-shaped dumping-lever having a series of notches and pivoted to the part C, the levers G and L, the slotted arm pivoted to the part D and adjustably connected to the lever L, and the foot-lever pivoted in the part D and carrying a pin engaging the elbow, the lever L, having vertical extension K, provided with offset p, and the projecting pivot-pin O', substantially as described.

In testimony whereof I affix my signature in presence of two witnesses.

FRANK FOWLER.

Witnesses:
R. T. PHILLIPS,
Q. E. BOUGHEY.